No. 738,113. PATENTED SEPT. 1, 1903.
H. LEITNER & R. N. LUCAS.
SYSTEM OF ELECTRIC LIGHTING.
APPLICATION FILED DEC. 22, 1902.
NO MODEL.
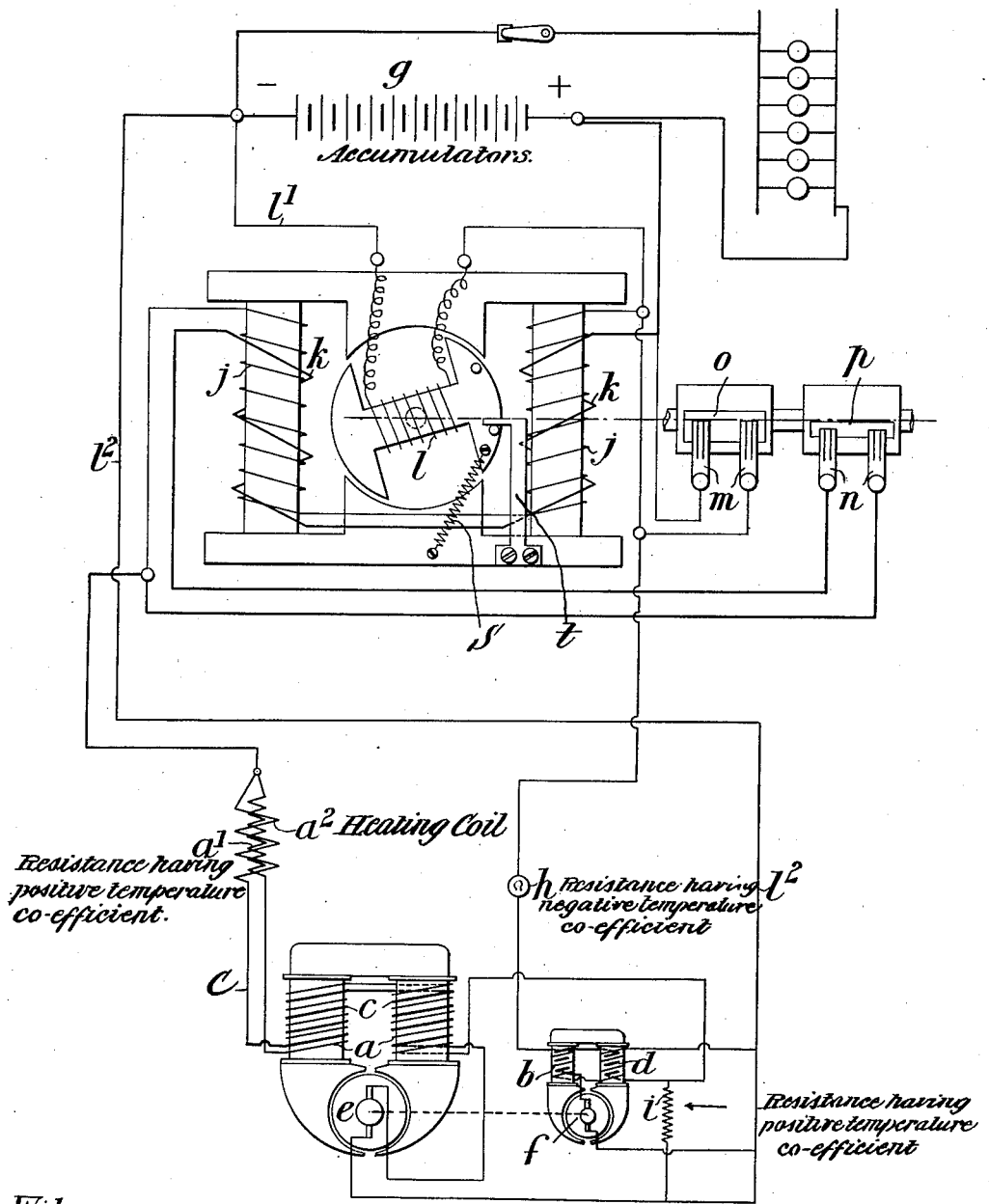
Witnesses
Inventors.

No. 738,113. Patented September 1, 1903.

UNITED STATES PATENT OFFICE.

HENRY LEITNER, OF WOKING, AND RICHARD NORMAN LUCAS, OF BYFLEET, ENGALND.

SYSTEM OF ELECTRIC LIGHTING.

SPECIFICATION forming part of Letters Patent No. 738,113, dated September 1, 1903.

Application filed December 22, 1902. Serial No. 136,267. (No model.)

*To all whom it may concern:*

Be it known that we, HENRY LEITNER, residing at Maybury, Woking, and RICHARD NORMAN LUCAS, residing at Rose Villa, Byfleet, Surrey, England, both subjects of the King of Great Britain, have invented new and useful Improvements in Systems of Electric Lighting, of which the following is a specification:

Our invention has reference to an improved system of lighting railway-trains in which current is obtained from a dynamo driven from one of the axles of the vehicle and adapted to charge a battery of accumulators mounted on it. It has special reference to systems in which two dynamos mounted on the same shaft with one another are arranged so as to neutralize the effect of increased speed in raising the voltage and give within certain limits an approximately constant voltage and current, no matter what the speed may be. In such systems where one dynamo is employed to weaken the field of another dynamo (the main generator) as the speed increases we have found that difficulties are encountered in keeping the voltage constant and that in consequence when arranged to charge a battery of accumulators such a combination gives too high a current at intermediate speeds of the train and too low a current when the speed becomes increased beyond a certain moderate limit.

The object of our invention is to introduce greater constancy of current and voltage within the limits of working speed or, in other words, to increase the range of the system.

In carrying out our invention in practice an arrangement which we have found to be effective is the following: Two dynamos are mounted on the same shaft, the smaller subsidiary dynamo being arranged with its armature in series with the shunt-winding of the main generator in such a manner as to weaken the current flowing through that shunt-winding approximately in proportion as the speed of the two machines increases; but we prefer to provide the field of the subsidiary or demagnetizing dynamo with a series winding through which the exciting-current of the shunt-winding of the main dynamo passes, this series winding being in series with it and with the armature of the subsidiary dynamo or demagnetizing-machine, so that the shunt-current of the main dynamo passes both through the armature of the subsidiary dynamo and through its series winding in addition to energizing the shunt-winding of the main machine. The main generator itself is preferably provided with a differential series winding tending to reduce the magnetism of its field or fields when current passes through it, and through this winding we take the current generated by the main generator when charging the cells. The shunt-winding of the subsidiary dynamo, which provides the demagnetizing effect, is under the normal working of the system arranged across the terminals of the main generator. The series winding on the field-magnet of the demagnetizing-machine assists the magnetism produced by the shunt-winding, in this respect differing from the series winding of the generator, which diminishes the field magnetism of the machine. In order to increase the range of the combination, it is necessary that the current passing through the shunt-winding of the main generator should be diminished whenever the voltage of that machine tends to rise to a greater extent than the action of the demagnetizing or subsidiary dynamo alone would reduce it and diminished less thereby when the main generator tends to fall. We effect this partly by introducing in series with the shunt-winding of the demagnetzing-machine a carbon resistance, preferably in the form of one or more incandescent lamps. We select carbon for this purpose, as it has a negative temperature coefficient—that is to say, its resistance tends to diminish as its temperature increases; but we may employ instead of it any other convenient material having that characteristic—as, for example, sulfid of iron. In addition we provide a second path for the current of the shunt or fine-wire winding of the main generator preferably at a point between one end of the shunt-winding and the series winding on the demagnetizer by a resistance having a positive temperature coefficient. For this purpose we prefer to use iron wire. As a further means of diminishing the tendency to rise of voltage in the main dynamo we introduce in series with its shunt or fine-wire winding an additional resistance with positive temperature coefficient, also preferably of iron wire. The effect of this resistance may be increased by arranging it so as to be heated by the main current of the dynamo, which is led through a resistance-wire in close proximity to this iron-wire resistance in series with the shunt-winding of the generator-field. The action is then such that if the dynamo-current rises it increases the resistance of the said iron-wire resistance in series with the shunt-winding by increasing its temperature beyond that which it attains owing to the current passing directly through it.

In connection with the above-described appliances we employ a self-acting device for switching in the dynamo into the battery-circuit, so as to charge the latter when its voltage has risen to the required amount and for breaking the connection between the battery and the dynamo when the voltage of the battery exceeds that of the latter. This automatic switch may also be arranged so as to only introduce normal current to the principal winding of the demagnetizer-field after the main dynamo has excited.

The self-acting switch or "cut-out" which we prefer to employ consists of a field-magnet arranged like the field of a motor and of an armature provided with a fine-wire winding. The field-magnet is provided with a high-resistance fine-wire and a low-resistance coarse-wire winding, and the armature, on the shaft of which are mounted two or more sets of contacts, is normally held in its off position by a suitable spring. The fine-wire winding of the armature is arranged in series with the fine-wire winding of the field of the cut-out, and both are arranged to be energized by the main-generator current. When the generator excites itself and before the cut-out has executed its first movement, owing to the action of the current supplied to it thereby, the current from the generator passes through the fine wire-winding of the field of the cut-out and then divides, part flowing through the winding on the cut-out armature and part passing through the shunt-winding of the demagnetizing-dynamo. The field of the demagnetizer is under these circumstances very feebly magnetized, owing to the high-resistance fine-wire winding of the cut-out field being in series with it.

In order that our invention may be more readily understood, we refer to the accompanying diagrammatic drawing, which we hereby make part of this specification.

In the drawing, $a$ is the shunt or fine-wire field-winding of the main generator, $b$ being the corresponding fine-wire field-winding of the demagnetizing-dynamo.

$c$ is the series winding, through which the main current of the generator passes, $d$ being the series winding of the demagnetizer.

$e$ and $f$ represent the commutators, brushes, and armatures of the main generator and demagnetizing-dynamo, respectively, which are in practice preferably mounted on the same shaft.

$h$ is the carbon resistance or incandescent lamp in series with the fine-wire field-winding of the demagnetizer. Only one such resistance is shown in the drawing, but we may employ several in parallel or series with one another.

$i$ is the resistance with positive temperature coefficient arranged across the main-generator field and armature in the manner shown, so that some of the current flowing through the fine-wire field-winding $a$ may pass through it.

$a'$ is the iron-wire resistance in series with the fine-wire field-winding $a$, arranged around, preferably insulated from, and adapted to be heated by the generator-current when passing to the battery of accumulators $g$ through the resistance-wire or heating-coil $a^2$.

$l$ is the fine-wire high-resistance winding of the balanced armature of the device or cut-out for switching in the dynamo into the accumulator-circuit, so as to charge the battery of accumulators $g$. The shaft of this armature carries at its end two cylinders provided with the contact-pieces $o\ o$ and $p\ p$ for bridging the gaps $m\ m$ and $n\ n$, respectively.

$j$ is the fine-wire winding of the field of the cut-out, $k$ being its thick or low-resistance winding.

The armature of the cut-out and its shaft are held in the zero or off position by a spring $s$. (Shown in the drawing.)

The action of these arrangements is as follows:

When the speed of the main dynamo reaches such a point as to cause it to excite itself and generate current, its current passes through the series winding $c$ on its field, the resistance-wire $a^2$, and then through the high-resistance winding $j$ of the cut-out, after which it branches, part flowing through the armature-winding $l$ of the cut-out back by the path $l'$ and $l^2$ and part passing through the lamp $h$ and the fine-wire field-winding $b$ of the demagnetizing-dynamo to the other brush of the main dynamo. The effect produced by this field-winding $b$ is under these circumstances very small, as the high resistance $j$ is then in series with it.

When the field of the cut-out and its armature have both been energized by the current passing through $j$ and $l$, the armature revolves against the action of the spring, the contact-pieces $o\ o$ bridging the gap $m\ m$. The spring controlling the movements of the armature of the cut-out is so adjusted that this movement does not take place until the voltage of the generator is in excess of the battery $g$.

When the cut-out has turned so as to bridge the gap $m\ m$, the current then flows from the generator through the winding $j$ to the cells, charging them with a feeble current owing to the high resistance of $l$. At the same time the field-winding $b$ of the subsidiary dynamo is connected through the lamp $h$ to the battery $g$ and receives normal current.

When the voltage of the dynamo increases still further with increasing speed of rotation, the armature of the cut-out is turned still farther, so as to cause the contact-pieces $p\ p$ to bridge the gap $n\ n$. The gap $m\ m$, however, still remains closed, owing to the contact-pieces $o\ o$ being of sufficient size to keep it still further bridged after the second gap $n\ n$ is closed. The further movement of the armature of the cut-out may be prevented by a stop $t$, as shown. When the gap $n\ n$ is closed, the charging-current passes mainly through the thick-wire winding $k$, thereby strengthening the field of the cut-out and causing it to act after the manner of a holding-down relay.

When owing to the speed of the generator diminishing its voltage sinks to that of the battery of accumulators $g$, current ceases to pass through either of the field-windings $j$ or $k$ of the cut-out and the spring restores it to its normal position, breaking the gaps $n\ n$ and $m\ m$ and severing connection between the generator and the battery. If the voltage of the dynamo sinks very rapidly to below that of the battery, a momentary reversal of current in the cut-out windings $j$ and $k$ takes place, causing a reversal of magnetism in its field and assisting the spring in turning back its armature to zero position and breaking the gaps.

As in other similar arrangements the opposing electromotive force produced by the demagnetizing-dynamo tends to weaken the current flowing through the fine-wire field-winding $a$ of the generator. The effect thus produced is at different speeds, sometimes too great and sometimes too small, and though this is to a large extent corrected by the series demagnetizing field-winding $c$ on the generator, through which the main current flows and which tends to weaken its field, the resulting voltage and current cannot by those means alone be kept sufficiently constant over the wide range of speed involved in train-lighting. Such constancy, however, is obtained by the action of the carbon-lamp resistance $h$ and the iron-wire resistance $i$ and $a'$.

When the voltage of the generator rises or tends to rise, more current tends to pass through the lamp $h$ and the fine-wire winding $b$ of the demagnetizer. This extra current increases the temperature of the carbon of the lamp or lamps $h$ and reduces its resistance, thereby permitting a greater increase of current to flow through the winding $b$ than would take place if the resistance of $h$ were a constant quantity. The field of the demagnetizer is consequently disproportionately strengthened, and it tends to reduce the current in the fine-wire winding $a$ of the generator disproportionately. Similarly, if the voltage of the generator falls or tends to fall less current passes both through the fine-wire field-winding of the demagnetizer and the lamp or lamps $h$, and the resistance of the latter thereupon increases, weakening the magnetic field of the demagnetizer more than it would be weakened if the resistance of $h$ remain constant. A corresponding effect in the same direction is produced by the positive temperature coefficient (iron wire) resistance $a'$. The exciting-current to the fine-wire field-winding $a$ of the generator passes both through the armature $f$ and series field-winding $d$ of the demagnetizer and through the resistance $i$ in parallel. If now the voltage at the terminals of the generator rises or tends to rise, the portion of exciting-current which flows through $i$ tends to increase. This increases its temperature, and in consequence its resistance, the result being that more resistance is interposed to the passage of that portion of the exciting-current which flows through $i$ than would be the case if the resistance of $i$ remained constant. The result is to weaken the field of the generator. Similarly, if the voltage of the generator falls or tends to fail less current passes through the resistance $i$, its temperature sinks, and its resistance diminishes, allowing more current to pass through the field-winding $a$ and opposing the tendency to weaken its field. The function of the resistance $a'$ in series with the field-winding $a$ is similar. When the current from the generator to the accumulators passing through the resistance $a^2$, the resistance of which is suitably proportioned, increases, it heats $a^2$ and by juxtaposition also heats $a'$. This increases the resistance of $a'$, and thereby diminishes or tends to diminish the current in the field-winding $a$. Correspondingly, if the current of the generator sinks the temperature of $a^2$ falls and that of $a'$ also diminishes. Its resistance, therefore, decreases and more current flows or tends to flow through the field-winding $a$, thereby strengthening the field of the generator and tending to raise its voltage or current.

We have described our invention as employing all three of these arrangements— namely, a resistance with negative temperature coefficient (carbon) in series with the fine-wire winding of the demagnetizing-dynamo, a resistance with positive coefficient (iron wire) in shunt with the demagnetizer, and a resistance with positive temperature coefficient (iron wire) adapted to be heated by the current from the main generator; but it will be understood that we may without departing from the spirit or scope of our invention use any one or two of these devices without employing them all at the same time. Similarly, we have shown our invention applied to a system in which both the main generator and demagnetizing-dynamo are provided with series field-windings connected as shown and mounted on the same shaft, as we have found that this gives the best practical results; but the invention may also be applied in a system in which neither the main generator nor demagnetizer are provided with series windings or in a system in which neither or only one of them is so constructed and the subsidiary dynamo driven at a speed bearing a fixed proportion to that of the main generator. We have also described the effect of the resistance $i$ merely as it influences the voltage of the main generator; but it also subserves another useful purpose—namely, that of facilitating the excitation of the main generator by providing a path for the current to the field-winding $a$ by which it can pass without traversing the armature and commutator of the demagnetizing-dynamo, the resistance of $i$, as its temperature is then low, being small. Similarly, we have described the self-acting switch as merely closing two gaps in the manner and for the purposes set forth; but we may also adapt it to insert or cut out resistance between the accumulators and the lamp-circuit according as the generator is or is not furnishing current. Likewise we have described in the above combination a form of cut-in and cut-out device which has special advantages, as the moving part consists of a balanced armature and is therefore peculiarly suited for use in the lighting of railway-trains; but it will be understood that we may employ instead of it any other suitable form of cut-out that will cut out the dynamo from connection with the accumulator-circuit when its voltage sinks below a certain point and cut it in when its voltage rises to the necessary extent, provided it be correspondingly connected in the circuits.

Having now particularly described and ascertained the nature of our said invention and in what manner the same is to be performed, we declare that what we claim is—

1. In a system of electric lighting by means of a main generator or dynamo driven at variable speed, and a subsidiary dynamo driven at the same or proportional speed and adapted to weaken the field or fields of the main generator as the speed of driving increases, the combination therewith of a resistance having a negative temperature coefficient, arranged in series with the shunt or fine-wire winding of the subsidiary dynamo, of a resistance having a positive temperature coefficient, adapted to be heated by the main-generator current, and arranged in series with the shunt or fine-wire winding of the main generator, and of a resistance having a positive temperature coefficient arranged in shunt with the subsidiary or demagnetizing dynamo for the purposes set forth and described.

2. In a system of electric lighting by means of a main generator or dynamo driven at variable speed, and a subsidiary dynamo driven at the same or proportional speed, and adapted to weaken the field or fields of the main generator as the speed of driving increases, the combination therewith of a resistance having a negative temperature coefficient arranged in series with the shunt or fine-wire winding of the subsidiary dynamo, and of a resistance having a positive temperature coefficient and adapted to be heated by the main-generator current, and arranged in series with the shunt or fine-wire winding of the main generator, for the purposes set forth and described.

3. In a system of electric lighting by means of a main generator or dynamo driven at variable speed, and a subsidiary dynamo driven at the same or proportional speed, and adapted to weaken the fields of the main generator as the speed of driving increases, the combination therewith of a resistance having a negative temperature coefficient arranged in series with the shunt or fine-wire winding of the subsidiary dynamo, for the purposes set forth and described.

4. In a system of electric lighting by means of a main generator or dynamo driven at variable speed, and a subsidiary dynamo driven at the same or proportional speed, and adapted to weaken the field or fields of the main generator as the speed of driving increases, the combination therewith of a self-acting switch comprising a magnetic field with fine-wire and coarse-wire windings, a movable armature, and movable contact-pieces adapted to be operated by the latter so as to bridge successively two gaps in the system, the said self-acting switch being arranged in the circuit in such a manner that when the generator excites itself, the switch closes one gap, thereby permitting the fine-wire field-winding of the demagnetizing-dynamo to receive normal current while when the speed and voltage of the generator rises, the said self-acting switch closes a second gap through which when closed, the generator-current by way of the coarse-wire winding of the field of the self-acting switch passes to charge the accumulators in the manner described and set forth.

HENRY LEITNER.
RICHARD NORMAN LUCAS.

Witnesses:
C. G. REDFERN,
A. ALBUTT.